United States Patent [19]

Katz

[11] Patent Number: 4,930,150
[45] Date of Patent: * May 29, 1990

[54] TELEPHONIC INTERFACE CONTROL SYSTEM

[75] Inventor: Ronald A. Katz, Los Angeles, Calif.

[73] Assignee: First Data Resources Inc., Omaha, Nebr.

[*] Notice: The portion of the term of this patent subsequent to Dec. 20, 2005 has been disclaimed.

[21] Appl. No.: 260,104

[22] Filed: Oct. 20, 1988

Related U.S. Application Data

[63] Continuation-in-part of Ser. No. 18,244, Feb. 24, 1987, Pat. No. 4,792,968, which is a continuation-in-part of Ser. No. 753,299, Jul. 10, 1985, abandoned.

[51] Int. Cl.$^5$ .......................................... H04M 11/06
[52] U.S. Cl. ........................................ 379/93; 379/92; 379/67
[58] Field of Search .................... 379/92, 93, 91, 67

[56] References Cited

U.S. PATENT DOCUMENTS

| | | | |
|---|---|---|---|
| 4,757,267 | 7/1988 | Riskin | 379/113 |
| 4,792,968 | 12/1988 | Katz | 379/92 |
| 4,797,911 | 1/1989 | Szlam et al. | 379/67 |

FOREIGN PATENT DOCUMENTS 8700375 1/1987 European Pat. Off. .............. 379/91

OTHER PUBLICATIONS

Ozawa et al., "Voice Response and Its Applications", Hitachi Review, vol. 28, No. 6, 12/79, pp. 301–305.
"T/VIS Voice Response Telephone Interface", Telesensory Speech Systems, 1913.

Primary Examiner—Robert Lev
Attorney, Agent, or Firm—Nilsson, Robbins, Dalgarn, Berliner, Carson & Wurst

[57] ABSTRACT

Call data signals actuated by a telephone terminal are provided from a telephone communication system to indicate call data as the called number, the calling number and the calling equipment. The call data signals address related control functions for interfacing a multiple-format multiple-port data processing system. Screening tests and format selection for the processing system are performed. Individual telephone terminals and individual data formats are interfaced under controlled conditions specified by the call data. Time tests, history tests and demographic tests are executed in addition to basic qualification tests. Control is executed from active data storage for assembled control words and record words. Record words for individual calls are stored along with developed billing data.

19 Claims, 5 Drawing Sheets

TELEPHONIC INTERFACE CONTROL SYSTEM

RELATED SUBJECT MATTER

This is a continuation-in-part of Application Ser. No. 018,224 filed Feb. 24, 1987 and entitled "Statistical Analysis System For Use With Public Communication Facility", now U.S. Pat. No. 4,792,968, which was a continuation-in-part of Application Ser. No. 753,299 filed July 10, 1985 and entitled "Statistical Analysis System For Use With Public Communication Facility", now abandoned.

BACKGROUND AND SUMMARY OF THE INVENTION

Over the past several years, substantial expansion has occurred in the technology of combining telephonic and computer systems. For example, telephone systems have been developed to readily transmit digital data. Various forms of modems are in wide-spread use to intercouple telephones and computers. However, at a more personal level, it also has been proposed to utilize the traditional dialing buttons of telephone instruments to provide digital data, as for processing. In accordance with such arrangements, voice messages prompt callers to provide data by actuating the alphanumeric buttons of conventional telephones. These systems have been proposed in association with computers to provide various services and one such system is disclosed in U.S. Pat. No. 1,792,968, issued 12/20/88 to Ronald A. Katz from an application Ser. No. 07/018,244 filed Feb. 24, 1987.

With respect to telephonic-computer systems, attaining the interface format desired by an individual caller is sometimes complex and burdensome. Specifically, callers may be misdirected, screening may be ineffective and delays may be cumbersome. Also, records may be poor or non-existent. As a consequence, a need exists for an improved interface system for selectively interfacing a considerable number of individual callers with a multiple format processor, as to attain efficient and economical digital and vocal exchanges along with data accumulation.

In general, the present invention comprises a telephonic-computer interface system accommodating digital and vocal (analog) telephonic communication and capable of handling a large number of calls to interface a plurality of formats in a computer apparatus. Accordingly, the system of the present invention interfaces: (1) a telephonic communication facility including remote terminals for individual callers, e.g. conventional telephone instruments including voice communication means, and digital input means in the form of alphanumeric buttons for providing data and (2) a multiple-port, multiple-format data processor for concurrently processing data from a substantial number of callers with respect to any of several formats.

The interface system incorporates a controller for receiving calls from remote terminals for association with ports in the telephonic computer apparatus, and which receives signal-represented call data (representing "calling" and "called" telephone numbers) along with equipment information. An index apparatus is controlled by the signal-represented call data to select a specific format of the processor so as to specify any conditions for the interface, at least one of the formats including at least one condition. A test apparatus determines whether or not an individual call attains specified conditions and thereby controls switching structure for providing the actual interface. Data is recorded and processing procedures also may be controlled by call data.

BRIEF DESCRIPTION OF THE DRAWINGS

In the drawings, which constitute a part of this specification, an exemplary embodiment exhibiting various objectives and features hereof is set forth, specifically.

DESCRIPTION OF THE ILLUSTRATIVE EMBODIMENT

As required, a detailed illustrative embodiment of the present invention is disclosed herein. However, physical communication systems, data formats, and operating structures in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
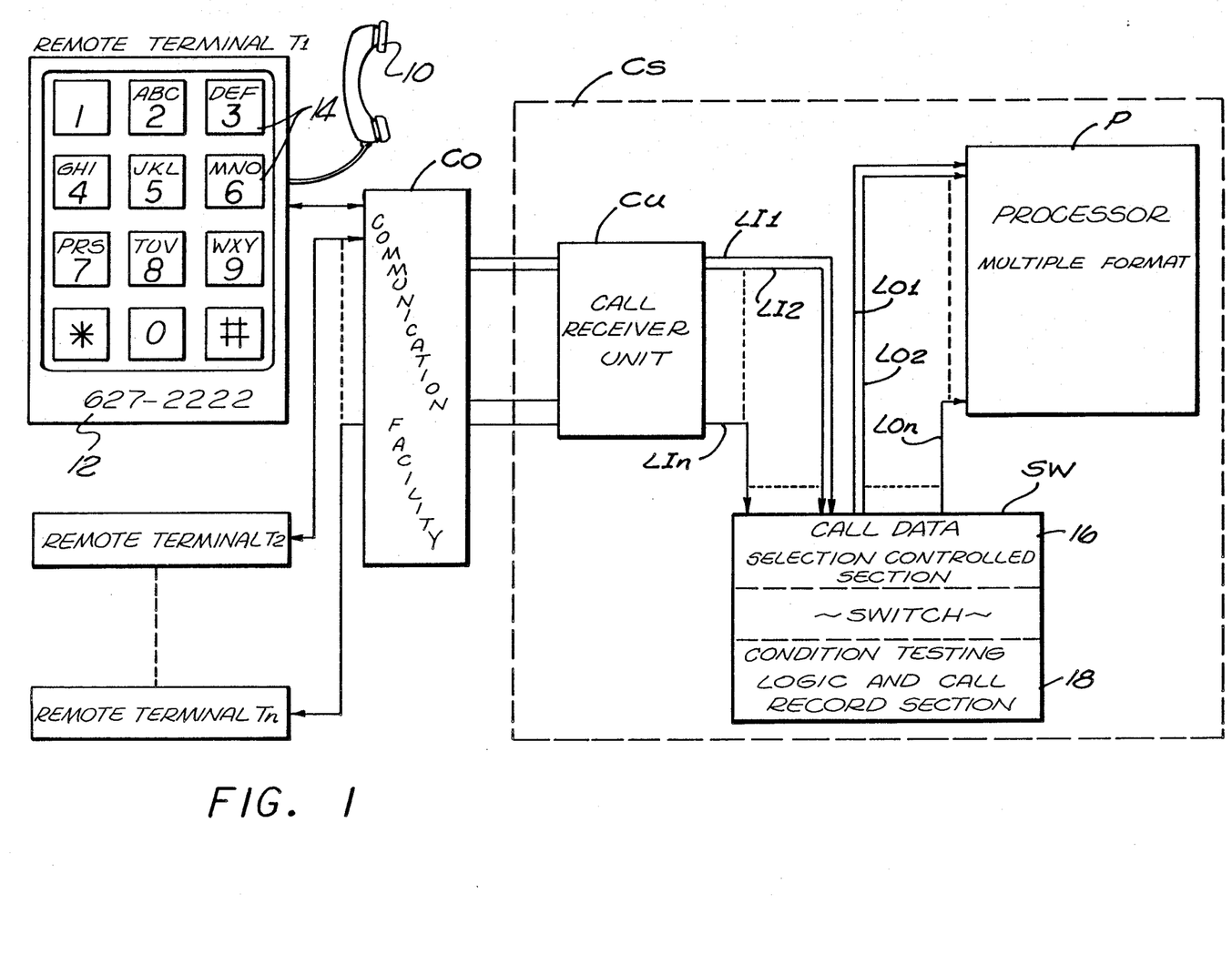
FIG. 1 is a block diagram of a system constructed in accordance with the present invention.

Referring initially to FIG. 1, a series of remote terminals T1-Tn (telephone instruments) are represented (left). The terminals T1-Tn are generally similar and accordingly only the terminal T1 is shown in any detail. The indicated terminals T1-Tn represent the multitude of telephone terminals existing in association with a communication facility CO which may comprise a comprehensive public telephone network.

The communication facility CO, along with the individual terminals T1-Tn, is coupled to a central processing station CS generally indicated by a dashed-line block. Generally with regard to the station CS, individual terminals T1-Tn are interfaced with a processor P (upper right) through a call receiver unit CU and a switch SW. In accordance herewith, individual telephone calls are preliminarily processed on the basis of signal-represented call data to identify a specific operating format of the processor P. The preliminary processing may impose screening tests to impose conditions or establish a test criteria for the switch SW to determine the acceptability of the call to interface with a specific operating format.

Calls are selectively processed according to a specific operating format as indicated by call data. At any instant of time, the collective interface may involve several thousand calls simultaneously being processed through ports of the processor P. Exemplary selected formats of the processor might include: public polls, lotteries, auctions, promotions, sales operations and games. Accordingly, the processor P may take the form of a sizable computer capable of simultaneously processing many calls involving several different formats. Although numerous possible configurations are available, for purposes of explanation, the processor P is illustrated simply as a block with multiple ports. Note that while the switch SW and the processor P may be integrated in a single system, they are separately illustrated to isolate the detailed structure and process of the present invention.

Input lines LI1 through LIn from the call receiver unit CU enter the switch SW to provide calling data and communication paths. Output lines LOI through LOn function similarly between the switch SW and the processor P. Note that various multiplexing techniques are well known in the telephonic art to communicate call data and may be employed in the system.

Considering the system somewhat summarily, individual calls originating at the terminals T1-Tn are coupled through the communication facility CO and the call receiver unit CU to the switch SW. Call data, representative of calls, actuates the switch SW to preliminarily process each call based on the desired format. Accordingly, depending on the desired format (indicated by the called number and the equipment data) calls are screened by testing for specific conditions. Furthermore, record data is assembled for storage.

Considering the system of FIG. 1 in somewhat greater detail, the exemplary telephone terminal T1 includes a handpiece 10 (microphone and earphone) and a panel 12 provided with a rectangular array of push buttons 14 in a conventional configuration. Of course, the handpiece 10 accommodates analog signals while the panel 12 is a digital apparatus. Generally, the handpiece 10 serves to manifest analog or voice signals to a caller.

In accordance with conventional telephone structure, alphabetic and numeric designations are provided on the buttons 14. For example, several of the buttons 14 carry three letters along with a decimal digit. Specifically, the button designated with the numeral "2" also carries the letters "A", "B" and "C". Thus, the buttons 14 encompass the numerals "0–9" two symbols, and the alphabet except for the letters "Q" and "Z". Consequently, the buttons 14 substantially accommodate the entry of decimal and alphabetic data.

At this stage, same specific aspects of the communication facility CO are noteworthy. Essentially, with telephonic dialing, the communication facility CO couples selective terminals (from the multitude of terminals T1-Tn) to the call receiver unit CU. In that regard, the call control unit CU at the central station CS may be reached by any or a plurality of called numbers. For example, the call unit CU might be reached by any of twenty telephone dialing numbers, each associated with a specific operating format of the processor P. One called number or set of numbers might be associated with an auction format of the processor P. Another number or set of numbers might be associated with sales operating formats. Still another called number or set of numbers might identify a game format, and so on.

Incoming calls to the call receiver unit CU are identified by call data in accordance with telephone system techniques. As described below, the call data may specifically include digital signals representative of the called number the calling number (terminal number) and the terminal equipment.

In addition to attaining a preliminary interface with a selected format, individual calls may be screened based on the called number (identifying an operating format) and the calling number (caller identification) or the equipment. That is, the system of the present invention is based on a realization that signal-represented call data can be effectively utilized to selectively interface individual callers at remote terminals with specific operating formats of a data processor.

Considering the call data in somewhat greater detail, in accordance with current telephone systems, the communication facility CO may provide signal-represented call data for: the "called" number, the "calling" number and the equipment, e.g. "pulse" or "tone" terminal. Specifically, operating telephone equipment termed "DNIS" automatically provides the called telephone number in digital form from the communication facility CO. Somewhat similarly, existing telephonic equipment designated "ANI" automatically indicates the caller's (calling) number in digital signal represented form. Generally, time shared lines carry such call data and also may provide call data indicating equipment. Thus, the call unit CU may receive the called number, the calling number and an equipment designation, collectively termed call data, which data is utilized to establish control functions, as for example to select an operating format of the processor P and screen individual calls.

As described in detail below, call data is registered in the switch Sw to perform distinct control operations. Specifically, a selection section 16 of the switch SW identifies a specific desired format of the processor P. A testing section 18 of the switch SW screens calls for interface connections between individual terminals T1–Tn and the processor P.

Figure 2:
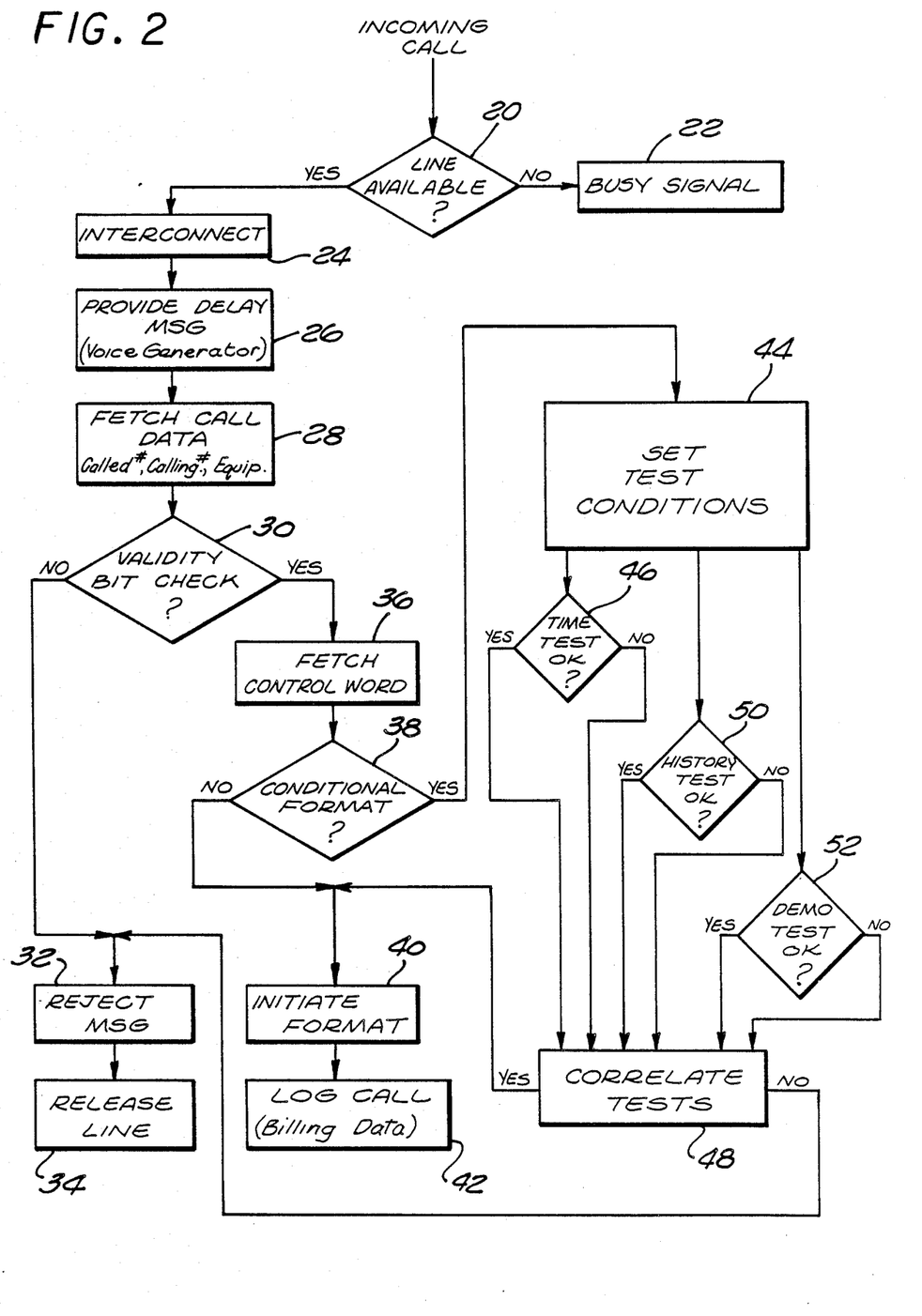
FIG. 2 is a flow diagram illustrating the operating process of the system of FIG. 1.

In the illustrative system of FIG. 1, an operating process is executed as illustrated in FIG. 2. Each incoming call prompts a preliminary query as indicated by block 20 concerning the availability of a line or port into the processor P. In the absence of an available line, a busy signal is provided as indicated by the block 22. Alternatively, an available line results in a preliminary interconnect as indicated by a block 24 setting a conditional connection into operation.

As indicated by a block 26, during the screening or testing interval (typically measured in seconds or fractions of seconds) the caller remains on line and may receive a message. That is, the caller might hear silence or may continue to hear the traditional telephonic ringing sound. Alternatively, the caller might be given a brief vocal message to "stand by" as indicated by the block 26. In any event, the caller is held "on line" while the process continues.

With a call on a line, the communication facility CO (FIG. 1) provides signal-represented call data, e.g. the called number, the calling number and the equipment designation. As indicated by block 28 (FIG. 2) signals representative of the call data are captured to perform preliminary processing operations as will now be considered.

In the disclosed embodiment, as an initial test operation, the calling number is checked for validity as indicated by a block 30. For example, a list of calling numbers may be compiled that are to be denied access to any interface with the processor P. Negative calling numbers may result either by the choice of the person responsible for the calling number terminal, or by the choice of the service operating the processor P (FIG.

1). For example, an accumulation of prior improper transactions from a terminal designated by a specific telephone number may provide a basis for complete disqualification. Equipment also may disqualify.

Recognizing that various circumstances may be involved with respect to the total disqualification of a calling terminal, in accordance herewith the test involves formulation of a validity bit as indicated by the query block 30. Acceptable calls set the validity bit at a binary "1".

If the calling terminal is invalid, ("no" from the block 30) the call is rejected as indicated by the block 32 with or without a message and the line is released as indicated by the block 34. Note that the time interval involved is very short and the rejection message may take various forms including a verbal comment, a busy signal or simply a disconnected signal.

If a positive validity bit ("1") is formed at the junction of the query block 30, a control word is fetched under command of the called number as indicated by the block 36. As described in detail below, a control word is available or each operating format of the processor P and is utilized to impose the conditions for an interface and the terms of any associated billing.

As indicated in FIG. 2, the fetched control word of the block 36 prompts an inquiry as to the conditions attendant the selected operating format as indicated by a query block 38. That is, in the process, the query of block 38 determines whether further conditions are imposed for attaining interface with the processor P. If no further conditions are imposed, the format is initiated by pursuing the connected interface as indicated by a block 40. Also, as indicated by a block 42 the call is logged or recorded as with respect to billing data for example.

If access to a format involves conditions ("yes" from the query block 38), tests are specified as illustrated by a block 42. That is, conditions for the interface are specified by the block 44. Of course, the specific tests may involve various criteria; however, in the illustrative embodiment, the conditions involve time, history and demographics. Each exemplary condition will now be considered somewhat preliminarily.

In the disclosed embodiment, time tests involve testing the time or the call against certain limitations. For example, it may be desirable to limit some formats to specific time intervals as in relation to a television broadcast, a real time auction and so on. Note that the time tests also may be related to specific terminal control and geographic areas treated on the basis of telephone area codes. Specific examples will illustrate.

Assume an operating game format that propounds questions to a caller based on knowledge of a particular television program. The program may be broadcast at different times in different geographic areas, and as a consequence it may be desirable to limit calls interfacing the processor format depending on the area code of calling numbers. Accordingly, time tests may involve solely the instant time, or various combinations of time and call data. The specific test is determined as indicated by a block 46 (FIG. 2) imposing detailed operating instructions for the format. The test results are then correlated as represented by a block 48.

As indicated above, in accordance with the described embodiment, another test involves a historical record as for example directed to the station identified by the calling number. As an example, the record might take the form of either a negative or a positive file (for an individual format). In that regard, formats involving "pay to dial" calls might be conditioned as a group. Generally, in the case of a negative file, certain numbers are recorded that are to be denied access to a particular operating format. In the case of a positive file, access to the operating format is available only to calling numbers listed in the file.

Considering exemplary implementations of the system, a negative file may be based on limited or restricted use (as in the case of a lottery) or prohibitive use (telephone terminal owner choice). Formats accessible on a "one-time only" basis also may be controlled by negative lists. Thus, an operating format may be inaccessible to a terminal, or may be accessible a specified number of times during a specified interval, e.g. three accesses per week. The historical test is symbolized in FIG. 2 by the query block 50 to conditionally actuate the related tests as indicated in the block 48. History limitations also may involve purely format limits. For example, a give-away or dial-free format may be limited to some predetermined number of calls for a period, e.g. ten thousand calls per day. Thus, limits can be imposed on the economic exposure of a format.

Moving from the historic considerations, demographic tests may be specified as in relation to the geographic area manifest by the area code of the calling number. To consider a specific example, a public opinion poll may be conducted in which a particular geographic balance is defined. In such an operating format, calls maY be accepted only until particular quotas are attained with respect to specified area codes. Such tests in the process are indicated by the query block 52, again to instruct the correlation block 48.

With the requisite tests established by selection of a format, the clock 48 indicates resolving the acceptability of the call for the selected interface face format. If the call is accepted, the process moves to initiate the selected format interface as indicated by the block 40. Conversely, if the call is to be rejected, the process moves to the step indicated by block 32, i.e. reject the call as with a message and release the line.

Figure 3:
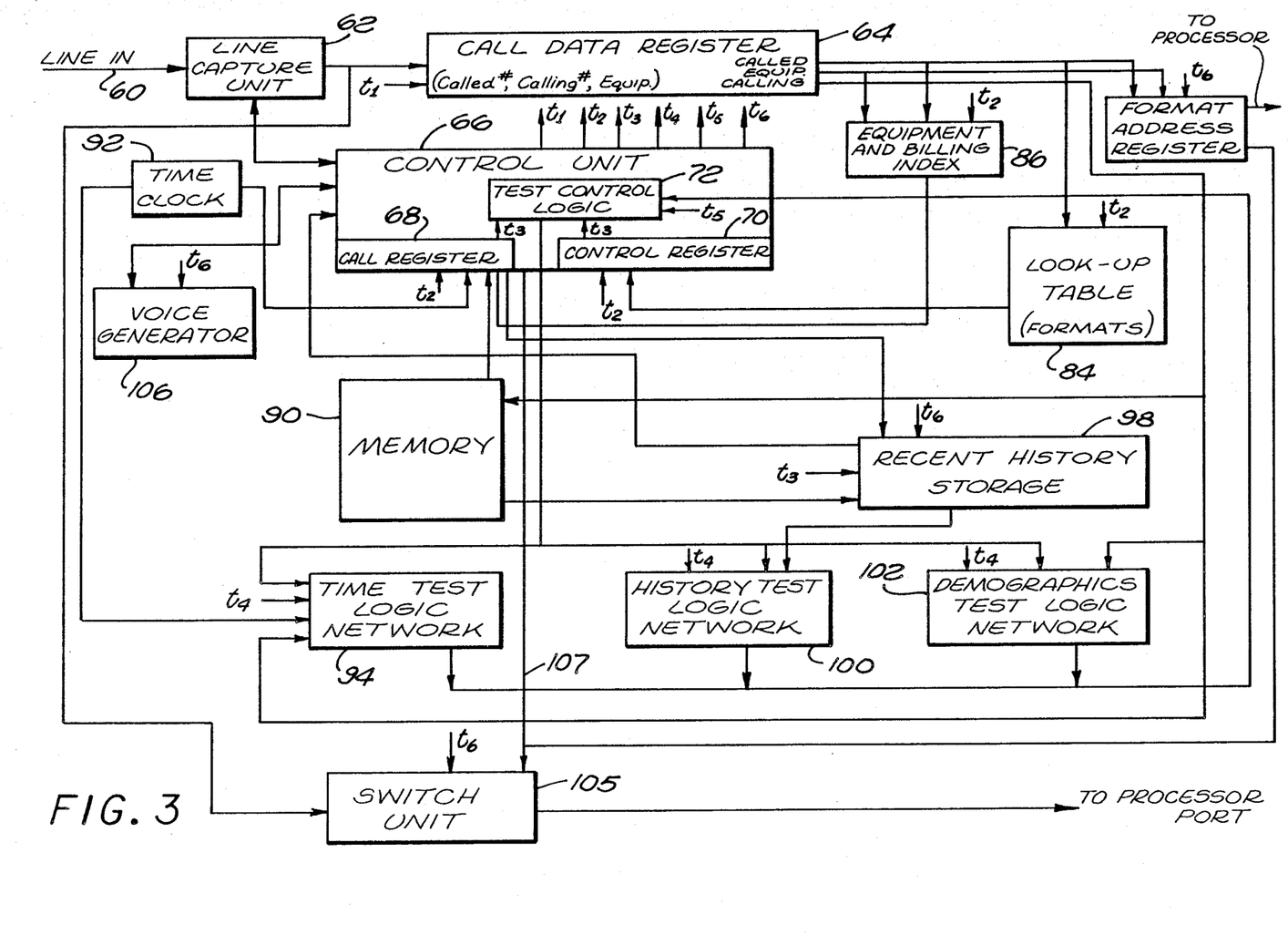
FIG. 3 is a block diagram of a component portion of the system of FIG. 1.

Exemplary detailed structure of the switch SW (FIG. 1) for executing the process of FIG. 2 is represented in FIG. 3. in that regard, individual telephone calls are manifest from the call receiver unit CU (FIG. 1) comprising existing equipment as well known in the prior art. The call data is supplied through a line 60, upper left, FIG. 3. Note that the represented single line 60 is merely symbolic of a channel to carry call data and provide direct telephone communication.

Generally, the system of FIG. 3 illustrates elements of the switch SW of FIG. 1 for processing an individual call. As indicated above, the system of the present invention involves the simultaneous processing of many calls with the possibility that numerous calls are simultaneously being tested for an interface as explained above. Consequently, although the system of FIG. 3 is illustrated with respect to testing a single call, it is to be understood that sequential or parallel operations and multiplexing techniques, as well known and widely practiced in the computer field, are utilized to accomplish multiple processing operations as described below with reference to FIG. 3.

The line 60 (FIG. 3, upper left) enters a line capture unit 62 through which signal-represented call data is supplied to a call data register 64. Accordingly, the call data is registered to be available for processing operations as explained generally with reference to FIG. 2.

The line capture unit 62 also is connected to cue a control unit 66. Structurally, the control unit 66 may take the form of various computer facilities incorporating memory and logic capability to sequence and control specific functions explained below. In that regard, the control unit 66 provides a series of timing signals t1–t6 to sequence the operations of individual component blocks as illustrated. Note that to preserve clarity in FIG. 1, connections of timing signals t1–t6 are not illustrated.

Figure 4:
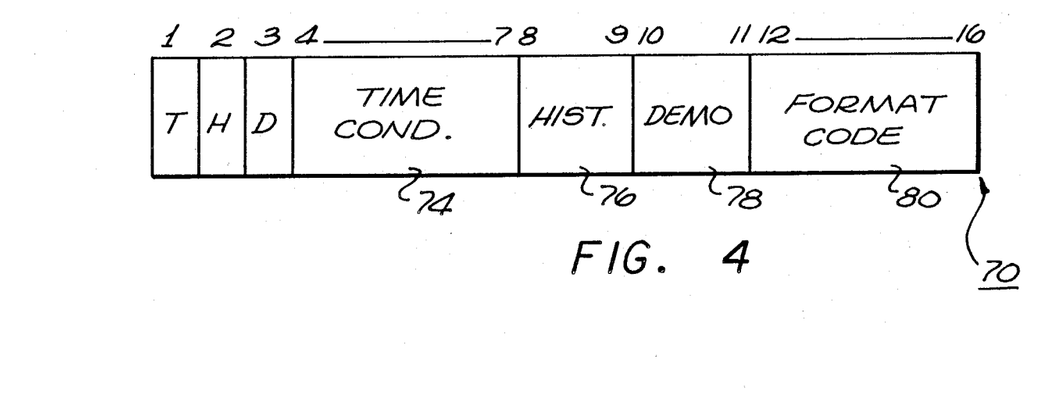
FIG. 4 is a diagrammatic representation of a binary control word as registered and utilized in the system of FIG. 1.

The control unit 66 specifically includes a call register 68, a control register 70 and test control logic 72. The control register 70 receives format control words specified by the called number and having a form as illustrated in FIG. 4.

Recapitulating, each of the operating formats has a control word for defining any access conditions or limitations to interface the format in the processor P (FIG. 1). Basically, the control words are sixteen bits, illustrated as the first sixteen bits (1–16) registered in FIG. 4. Additional registered bits (17–20) are provided from call data.

The initial three registered bits in the control register (FIG. 4) serve as test command bits respectively for a time test, a history test and a demographics test. The presence of a "1" bit in any of the first three bit locations specifies the requirement for testing compliance to specified conditions. A "0" bit indicates no test.

The bits "4 through 7" in the control register constitute a field 74 and specify time conditions in relation to the instant time of the call. The field 74 may specify eight distinct time conditions. For example, exemplary specified conditions for a format might be as follows:

Accept calls between 7:00 and 18:00,
Accept calls on Thursday between 9:00 and 10:00,
Accept calls from area code 213 on Wednesday between 15:00 and 16:00,
Accept calls from area code 602 on Wednesday between 16:00 and 17:00.

Essentially, the time condition field 74 (activated by the time bit "1"—first bit position) defines specific intervals during which calls will be accepted for the specific called number and may be further limited by the area codes. A wide range of possibilities are available to accommodate specific programs for individual formats.

A field 76 in the control register embraces bits "8" and "9" and defines the conditions for access to the format based on historical considerations. Thus, two bits are provided to indicate four possible historical limitations. Again, the test is specified by a "1" bit, in this instance in the second bit location of the register 70. The following limitations are exemplary of many possibilities:

Accept one call per day,
Accept one call per week,
Accept one call per month,
Accept one call during any three-day period,
Accept only 10,000 calls.

Continuing with respect to the contents of the register 70, as illustrated in FIG. 4, bits "10" and "11" constitute a field 78 specifying demographic test limitations. Again, a few examples will illustrate the various possibilities:

Accept calls only from area code 213,
Accept calls from area codes 213, 818 and 619,
Accept only 1,000 calls from area code 213,
Accept calls from area code 213 with the prefix numerals 619.

Again, the demographic text is imposed only upon the existence of a "1" bit, in this instance in the third bit of the control word. As in the other cases, specific possibilities are considerable.

The bits "12" through "16" of the control word constitute a field 80 and designate a code for the identified format. These five bits enable a substantial number of formats to be designated and coded with respect to various classifications. For example, lottery formats might be encoded in a "100" decimal series, e.g. "101, 102, 103 —110, 111, 112"—and so on; auctions might be designated in a "200" series, e.g.: "201, 202, —". By using decimal equivalent coding formats for various categories, exclusions may be concisely stated. For example, a calling number may be excluded from all lottery operating formats simply by the specification of decimal "100".

The data, as illustrated in FIG. 4 is loaded into the control register 70. Again, the first sixteen bits comprise the format control word and are provided from a look-up table 84 (FIG. 3, right, central). The last bits (bits 17–20) are provided from an equipment and billing instruction index 86. That is, in response to the signal-represented call data indicating the called number and the equipment, the look-up table 84 and the index 86 supply data for loading the control register as indicated above.

Figure 5:
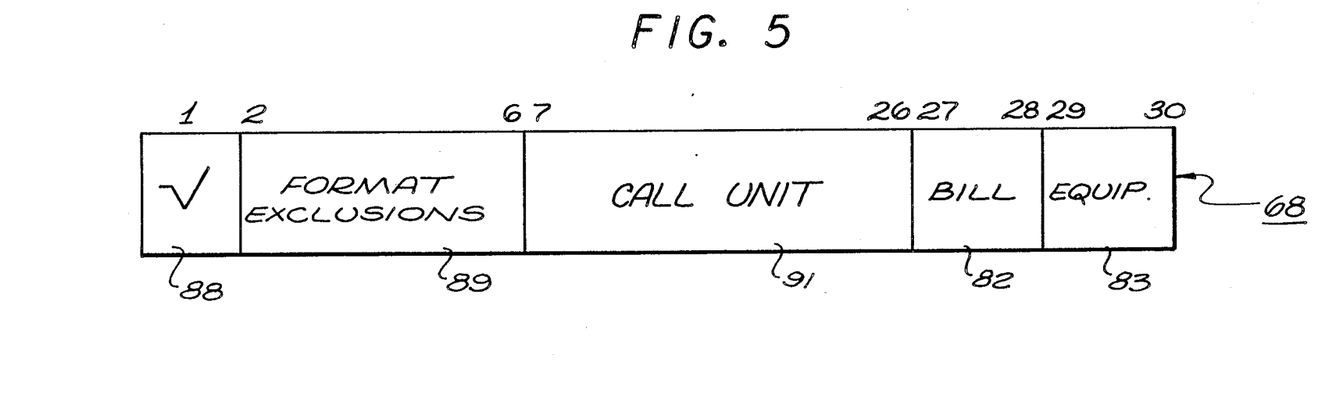
FIG. 5 is a diagrammatic representation of a binary data record word as utilized and recorded in the system of FIG. 1.

While the control register 70 is loaded to specify the operation of the system, the call register 68 in the control unit 66 receives signals for additional control and to formulate a record of the call. Specifically, as represented in FIG. 5, the contents of the call register 68 includes the initial validity bit 88 for indicating that the called number is either on a positive list or is not on a negative list. The determination of the validity bit for location 88 is made by reference to a memory 90 (FIG. 3, central) addressed by the calling number.

While the calling number addresses data to indicate a validity bit, specific format exclusions also may be indicated as explained above with respect to certain formats. For example, certain classifications of formats or specific formats (as a lottery) may be identified as inaccessible for certain telephone terminals as identified by calling numbers. Other than lottery formats, certain discretionary formats also may initiate control to limit access. Accordingly, a field 89 in the register 68 of FIG. 5 (bits "2" through "6") is provided from the memory 90, addressed by the calling number to specify format exclusions. That is, the calling number addresses the memory 90 to load the field 89 and specify limitations. Consider a few examples of format exclusions or limitations:

No lottery formats,
One lottery format per week,
Two lottery formats per month of total cost under $25.00,
No auction sales,
Auction sales only with code I.D. 763.

Again, it will be apparent that many possibilities exist in applying various coding techniques, the above merely being exemplary.

The bits "7" through "26" of the call register 68 (FIG. 5) constitute a field 91 and indicate the time of a call. Signals representative of the instant time of a call to load the field 90 are provided from a time clock 92 (FIG. 3, upper left). Signals from the time clock 92 may be in a Julian code and are provided to the call register 68 and also to a time test logic network 94 (lower left).

The last bits (27-30) in the register 68 are provided from the call data. The bits "27" and "28" indicate billing data and comprise a field 82. Again, representations are coded; however, with respect to the field 82 information is derived from the called number. For example, an "800" called number may indicate no billing with the representative code being stored in the field 82. As another possibility, a "976" prefix number, or "900" number, may indicate a specific charge in relation to the identified format.

The bits "29" and "30" comprise a field 83 and may actuate a special form of the selected format. In the disclosed embodiment, the field 83 registers call data, as to indicate that the calling terminal is a "pulse" (rotary dial) signal unit or a "time" (touch) signal unit. In the instance of a rotary terminal, the format program may be modified to accommodate "pulse" signal operation or inject operator communication.

Recapitulating to some extent with regard to the composition of the call record word in the register 68 (FIG. 5), the memory 0 (FIG. 3) is addressed by calling number data to provide data for the validity bit location 88 and the format-exclusion field 89. The time of call is stored in the field 91 from the clock 92. The billing and equipment data are provided by the index 86 in response to "calling" data signals.

Another element of memory, specifically, a recent history storage 98 (FIG. 3, lower right) is separately illustrated for convenience of explanation. Essentially, the storage 9 receives words from the call register 63 to maintain a record of interface calls. The recent history storage may periodically be purged to permanent storage if desired. Thus, the recent history storage 98 accumulates a historical record of all interface participants with respect to specific formats and is utilized in the history test for determining that an instant calling terminal is within the specified historical limitations as provided from the memory 90.

The history tests are performed by a history test logic network 100 (FIG. 3, lower central). In a related context, the demographics test as explained in detail above is performed by a demographics test logic network 102. The results of the test logic networks are communicated to the test logic 72 in the control unit 66. As a consequence a switch unit 105 is actuated to either operatively couple the line 60 into a port of the processor P (FIG. 1) or reject the call. If a call is accepted for an interface, a signal is supplied from the test control logic 72 through a line 107 to the switch 105 during the interval of the timing signal T6. The signal in the line 107 also is supplied to a format address register 109 for addressing the processor P The register 109 stores select data signals to address a specific operating format of the processor P.

Recapitulating to some extent, call data indicates an interface format of the processor P (FIG. 1) with associated limitations, conditions and billing provisions. Call data also indicates possible format limitations or conditions for a calling number. The system processes the data with respect to the conditions and limitations to selectively enable interface operations.

In view of the above structural description of the system of FIG. 3, the process as described with respect to FIG. 2 and the stored control word forms as described with respect to FIGS. 4 and 5, a comprehensive understanding of the described embodiment may now best be accomplished by assuming an exemplary call and treating the individual responsive steps. Accordingly, assume the occurrence of a call as manifest on the line 60 (FIG. 3, upper left). Further, assume that the called number, "976 513 7777" designates a lottery format with limited access. Details of the limited access will be treated below.

Upon occurrence of the call, the line capture unit 62 seizes a line relationship and signals the control unit 66. Immediately, an interval of time signal t1 is initiated and the register 64 is loaded with the called number ("976 513 7777"), the calling number ("415 318 4444") and the equipment designation (tone). To the caller, the operations as now described involve an almost imperceptible delay.

During the following interval of timing signal t2, the call register 68 and the control register 70 are loaded as illustrated in FIGS. 4 and 5. Specifically, the called number and equipment designation specify data to load the control register 70. The calling number ("415 318 4444") from the register 64, prompts the memory 90 to load the validity bit 88 and the format exclusions in the field 89 of the register 68. Concurrently, the time clock 92 loads the field 90 with signals representative of the current time.

If the call register 68 does not receive a validity "1" bit, the calling number is indicated to be barred with a consequence that the line is released by the control unit 66. In tnat regard, a voice generator 106 (FIG. 3, left central) may be actuated by the control unit 66 branching to the operation of timing signal t6. Accordingly, a message of denial may be provided on the line 60 prior to release of the line. Note that the voice generator 106 may be variously used to prompt or inform callers in certain preliminary selection operations supplemental to the specific operations disclosed below.

As indicated above, concurrently with the loading of the call register 68 (timing signal t2), the control register 70 also is loaded. Specifically, from the register 64, the called number cues the look-up table 84 to fill most of the control register (bits "1"through "16", FIG. 4). The fields 82 and 83 are supplied from the index 86.

That is, distinct from the fields loaded into the control register 70 from the look-up table 84, the fields 82 and 83 are supplied from the index 86. In that regard, assume the called number (area code 976) indicates that the charge for the service of the call will be billed through the caller's telephone records. Assume that the field 83 indicates a "tone" terminal effective for a conventional digital interface.

At this point, some still further assumptions will be made to pursue the explanation of the detailed operations. Specifically, assume that the format specified by the called number ("976 513 7777") is a lottery format and includes limitations with respect to time, history and demographics. Accordingly, the initial three bits of the control word all will be "1" bits in the control register 70.

Assume further tnat the time conditions specified by the field 74 (FIG. 4) limit calls from area code 415 to days other than Sunday. Assume that the history field 76 of the control word imposes a limitation of one call per day. Assume that the demographics field 78 excludes any call from area codes "512", "412", "812", — (not "415"). Finally, assume the selected format (field 80) designates a specific lottery format, that is lottery "128".

In addition to registration of the data sets detailed above, because a history test is specified, the recent history storage 98 is cued during the interval of timing signal t3. The operation is through the memory 90 by the control unit 66 to prompt the supply of historical data (previously registered record words) for the telephone terminal designated by the calling number ("415 318 4444"). Specifically, during the interval of timing signal t3, the storage 98 supplies data on the calling number to the history test logic network 100. Such data is compiled into a test format as to indicate the number of calls per day, per week, and so on. Note that aggregate call totals may also be supplied as a test criteria. Thus, the control unit 66 coordinates the test criteria data preparatory to the test operations of the individual logic networks 94, 100 and 102.

To summarize, in accordance with the above assumptions, the test control logic 72 is set up to coordinate the following specific logic tests:

Time limitation test by network 94: accept calls from area code 415 except on Sunday, History limit test by network 100: accept only one call per day, Demographics rest by network 102: accept no calls from area codes 512, 412, 812 — (415 not listed).

As explained above, in addition to the limitations specified, in relation to the format, further limitations may be specified by the calling number. Such limitations are specified by the field 89 in the register 68 (FIGS. 3 and 5). In the instant example, assume that according to the record word, participation in the lottery format is limited to the interval between 10:00 a.m. and 3:00 p.m., e.g. when minors are in school. The code for such a format is supplied during the interval of timing signal t3 from the field 89 of the call register 68 to further establish the set-up of the logic 94 acting through the test control logic 72.

Recapitulating with regard to the test control logic 72, essentially a program is defined imposing each of the limitations that are specified by the call data in sufficient detail that comparison tests are expediently performed by the networks 94, 100 and 102. It is stressed, as indicated above, that the tests are selectively performed only in the event a "1" bit appears in the representative first three bit locations of the control word format. In the illustrative example, all the tests were commanded and accordingly the test control logic 72 sets up the condition for tests to be performed by the networks 94, 100 and 102, all during the interval of timing signal t3. Of course, the specific example represents one possibility of a substantial number of programs that might be specified to the system.

Figure 6:
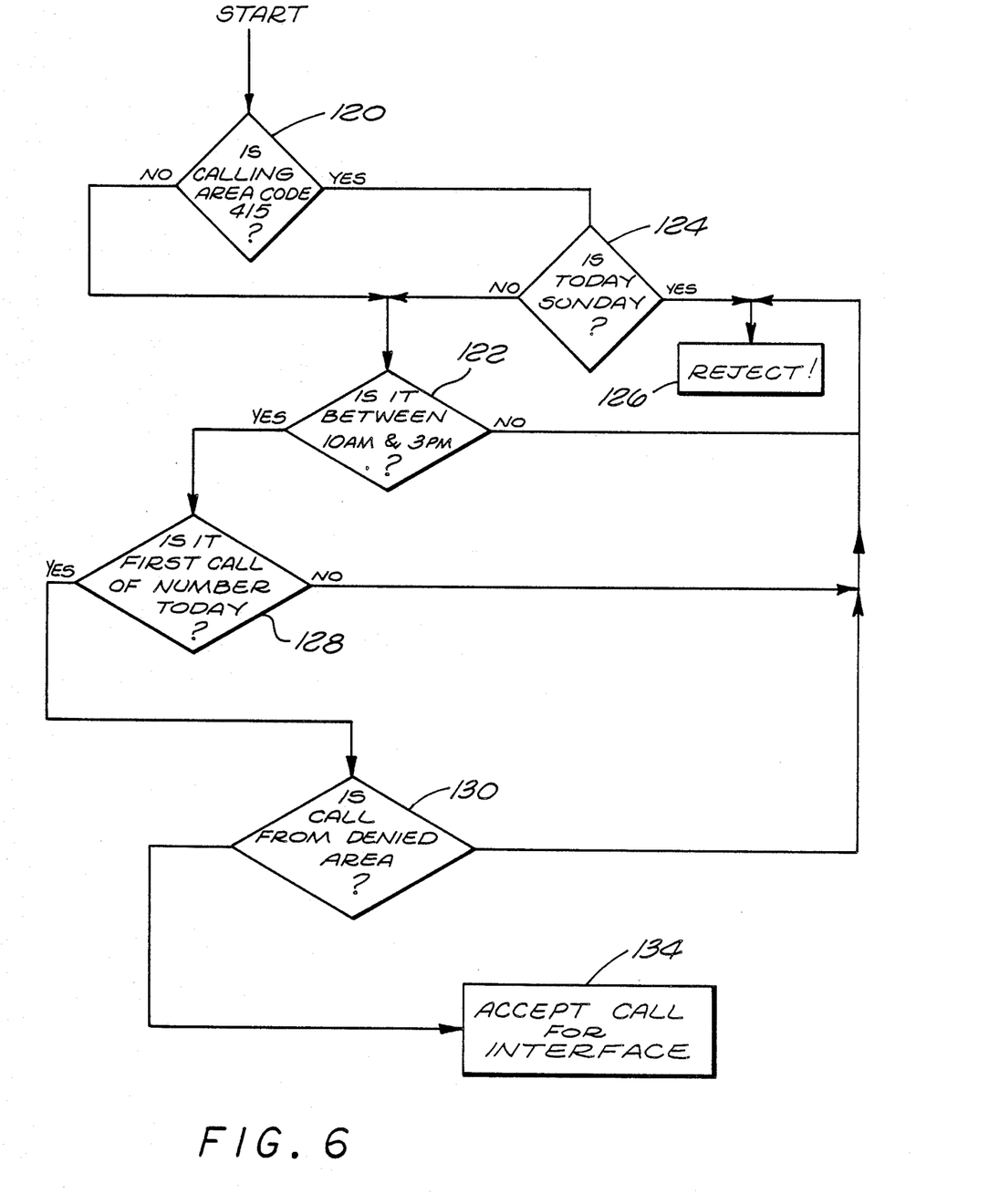
FIG. 6 is a flow diagram illustrating the operating process of the structure represented in FIG. 5.

With the test formats established in the test control logic 72, the logic networks 94, 100 and 102 are driven during the interval of test signal t4 to execute a program in accordance with the assumed example. The process may be variously implemented in logic using well known techniques and is detailed in FIG. 6. Consider the time test of the network 94. The time test logic network 94 approves an interface only if: the call is not from area code "415" on a Sunday and furthermore the call occurs between the hours of 10:00 a.m. and 3:00 p.m. As indicated in FIG. 6, a decision block 120 resolves the area-code "415" time test. If the area code is not "415", the logic proceeds to the next query block 122. Alternatively, if the area code is "415", the day must be tested against Sunday as indicated by the query block 124. An affirmative indication from the Sunday test of block 124 prompts a rejection as indicated by the block 126.

If the Sunday test of block 124 is passed, the program imposes another time test, that is the time-of-day test as indicated by the block 122. Again, a negative result prompts a rejection; however, a positive result involves the next step as indicated by the block 128.

Note that the operations designated by query blocks 120, 122 and 124 are performed by the time test logic network 94 (FIG. 3). The next test of the block 128 is performed by the history test logic 100.

The block 128 (FIG. 6) involves a determination of whether or not the instant call is the first for the calling terminal on the instant calendar day. If not, the limitations are exceeded and the call is rejected. If the test is passed, the process next involves the demographic test logic network 102 (FIG. 3) to determine whether or not the call originated from an excluded area based on the calling number area code.

Area controls are illustrated by the query block 130 of FIG. 6. Specifically, the demographics test logic network 102 determines whether or not the current call is from a denied area. If so, the call is rejected as indicated by the block 126. Alternatively, if the area is not excludes, as illustrated by the block 134 in FIG. 6, the interface is accepted. In the instant case, the area "415" is acceptable.

In the operation of the system as illustrated in FIG. 3, the logic networks 94, 100 and 102 indicate test results to the test control logic 72 during the interval of the timing signal t5. The logic 72 correlates the test result for action by the control unit 66. If the imposed conditions are met, the control unit 66 actuates the switch unit 105 and the address register 109 through the line 107 to perfect the interface from the line 60 (upper left) to a port in the processor P (FIG. 1). Essentially, during the interval of the timing signal t6, the switch unit 105 couples the line 60 to a part in the processor P. Concurrently, the address register 109 specifies the select operating format to the processor P. Thus, a caller is set up for a select interface format.

Also during the interval of the timing signal t6, the contents of the call register 68 is stored in the recent history storage 98. Note that billing data is stored with the call word is and may be selectively extracted from the storage 98. At the termination of the timing signal t6, the interface endures until "disconnect".

The select format may involve various records, however, in accordance with the system of the present invention affords considerable flexibility to program individual conditions and limitations for each interface format based on the call data (calling number and called number). An interface may involve no conditions or conditions may be imposed from the called number (format selection), the calling number, or both. Accordingly, effective control may be imposed depending upon the service requested as manifest by an individual format, the instant time, the history of use and the demographics involved. The imposed limitations may be non-existent or may involve a relatively complex test pattern as explained in detail above.

In the disclosed embodiment, an effective record of calls is accumulated in the recent history storage 98. Thus, a composite and detailed record is accumulated of individual calls as executed.

It is to be appreciated that numerous formats may be implemented and controlled utilizing the principles of the system as illustrated above. Accordingly, it is to be understood that the system of the present invention should be interpreted in accordance with the claims as set forth below.

What is claimed is:

1. An interface control system for use with, (1) a communication facility including remote terminals for individual callers, wherein said remote terminals may comprise a conventional telephone instrument including voice communication means and digital input means for providing data, and (2) a multiple port, multiple format processor for concurrently processing data from a substantial number of callers in any of a plurality of format, said interface control system comprising:

call data means for receiving calls from said remote terminals in association with ports of said multiple port, multiple format processor, said calls providing signalrepresented call data to said call data means;

selection means for selecting one format of said plurality of formats of said multiple port, multiple format processor, said selection means being controlled by said signal-represented call data from a calling remote terminal to thereby specify defined conditions for a connection to said multiple port, multiple format processor, at least one of said formats having at least one specified condition;

test means for testing the specified defined conditions for a calling remote terminal to provide approval signals; and interconnect switch means for providing connections from the ports of said multiple port, multiple format processor to a calling remote terminal under control of said approval signal from said test means.

2. A system according to claim 1 wherein one of said test means comprises means for executing a test based on the time of a call.

3. A system according to claim 1 wherein one of said test means comprises means for executing a test based on the history of the calling remote terminal.

4. A system according to claim 1 wherein one of said test means comprises means for executing a test based on the demographics of the calling remote terminal.

5. A system according to claim 1 wherein said index means includes a look-up table for specifying said formats of said processor addressed by said call data.

6. A system according to claim 1 including a control storage location and means for setting control data in said control storage location responsive to said call data to thereby control said test means.

7. A system according to claim 1 further including voice generator means for prompting a caller.

8. A system according to claim 1 further including means for storing data representative of calls.

9. A system according to claim 8 wherein said means for storing includes means for storing billing data.

10. A process for interfacing a telephonic communication system including remote terminals with a multiple port, multiple format data processing system, said multiple port, multiple format data processing system for concurrently processing data from said remote terminals according to a plurality of formats, at least one of said formats having at least one condition for a calling terminal, and wherein said telephonic communication system provides call data signals, as to indicate called and calling numbers, said process including the steps of:

receiving said call data signals from said telephonic communication system for a calling remote terminal;

selecting a processing format of said multiple port, multiple format processing system for the calling remote terminal under control of said data signals as the selected format;

testing the selected format in relation to said call data signals; and conditionally interfacing said selected format to a calling terminal under control of said testing of call data signals.

11. A process according to claim 10 further including the step of fetching control data addressable with said call data for use in the step of testing.

12. A process according to claim 11 including the step of composing a control word defining conditions for interfacing 13. A process according to claim 11 wherein said step of fetching control data includes fetching data to specify time constraint conditions.

14. A process according to claim 1 wherein said step of fetching control data includes fetching data to specify use history conditions.

15. A process according to claim 11 wherein said step of fetching control data includes fetching data to specify demographic conditions.

16. A process according to claim 10 further includes the step of formulating a record data word of a call.

17. A process according to claim 16 wherein said record data word includes billing data.

18. A process according to claim 16 wherein said record data word includes format data.

19. A system according to claim 1 wherein one of said test means comprises means for executing a test based on historical limitations applied to an individual format.

* * * * *

UNITED STATES PATENT AND TRADEMARK OFFICE
CERTIFICATE OF CORRECTION

PATENT NO. : 4,930,150

DATED : May 29, 1990

INVENTOR(S) : Ronald A. Katz

It is certified that error appears in the above-identified patent and that said Letters Patent is hereby corrected as shown below:

| Column | Line | |
|---|---|---|
| 1 | 6 | "018,224" should be --018,244--. |
| 1 | 30 | "1,792,908" should be --4,792,968--. |
| 3 | 48 | "same" should be --some--. |
| 3 | 54 | "or" should be --of--. |
| 5 | 22 | "or" should be --for--. |
| 5 | 38 | "42" should be --44--. |
| 5 | 45 | "or" should be --of--. |
| 6 | 30 | "maY" should be --may--. |
| 6 | 35 | "clock" should be --block--. |
| 6 | 36 | "face" should be deleted. |
| 9 | 21 | "0" should be --90--. |
| 9 | 30 | "9" should be --98--. |
| 9 | 52 | after "P" there should be a period. |
| 10 | 27 | "tnat" should be --that--. |
| 10 | 57 | "tnat" should be --that--. |
| 11 | 22 | "rest" should be --test--. |
| 12 | 23 | "excludes" should be --excluded--. |
| 12 | 37 | "part" should be --port--. |

UNITED STATES PATENT AND TRADEMARK OFFICE
CERTIFICATE OF CORRECTION

PATENT NO. : 4,930,150
DATED : May 29, 1990
INVENTOR(S) : Ronald A. Katz

It is certified that error appears in the above-identified patent and that said Letters Patent is hereby corrected as shown below:

| Column | Line | |
|--------|------|---|
| 13 | 43 | "index" should be --selection--. |
| 14 | 36 | "1" should be --11--. |

Signed and Sealed this

Seventh Day of January, 1992

Attest:

HARRY F. MANBECK, JR.

*Attesting Officer*     *Commissioner of Patents and Trademarks*

(12) EX PARTE REEXAMINATION CERTIFICATE (10835th)
United States Patent
Katz (10) Number: US 4,930,150 C1
(45) Certificate Issued: Mar. 30, 2016

(54) TELEPHONIC INTERFACE CONTROL SYSTEM

(75) Inventor: Ronald A. Katz, Los Angeles, CA (US)

(73) Assignee: Ronald A. Katz Technology Licensing, L.P.

Reexamination Request:
No. 90/012,136, Feb. 13, 2012

Reexamination Certificate for:
Patent No.: 4,930,150
Issued: May 29, 1990
Appl. No.: 07/260,104
Filed: Oct. 20, 1988

Certificate of Correction issued Jan. 7, 1992

Related U.S. Application Data (63) Continuation-in-part of application No. 07/018,244, filed on Feb. 24, 1987, now Pat. No. 4,792,968, which is a continuation-in-part of application No. 06/753,299, filed on Jul. 10, 1985, now abandoned.

(51) Int. Cl.
*G07C 15/00* (2006.01)
*G07C 11/00* (2006.01)
(Continued)

(52) U.S. Cl.
CPC .......... *H04Q 3/665* (2013.01); *G07C 11/00* (2013.01); *G07C 15/005* (2013.01); *G07C 15/006* (2013.01); *H04M 3/36* (2013.01); *H04M 3/38* (2013.01); *H04M 3/46* (2013.01); *H04M 3/493* (2013.01); *H04M 3/51* (2013.01); *H04M 11/00* (2013.01); *H04Q 3/002* (2013.01); *H04Q 3/5455* (2013.01); *H04Q 3/54533* (2013.01); *H04Q 3/54591* (2013.01); *H04Q 3/72* (2013.01); *H04Q 3/74* (2013.01); *A63F 2003/086* (2013.01); *H04M 3/42059* (2013.01); *H04M 3/42102* (2013.01); *H04M 3/436* (2013.01); *H04M 2201/40* (2013.01); *H04M 2203/2016* (2013.01); *H04M 2242/22* (2013.01); *H04Q 2213/1309* (2013.01); *H04Q 2213/1316* (2013.01); *H04Q 2213/1322* (2013.01); *H04Q 2213/1328* (2013.01); *H04Q 2213/1332* (2013.01); *H04Q 2213/13034* (2013.01); *H04Q 2213/1337* (2013.01); *H04Q 2213/13072* (2013.01); *H04Q 2213/13091* (2013.01); *H04Q 2213/13093* (2013.01); *H04Q 2213/13095* (2013.01); *H04Q 2213/13096* (2013.01); *H04Q 2213/13097* (2013.01); *H04Q 2213/13103* (2013.01); *H04Q 2213/13106* (2013.01); *H04Q 2213/13107* (2013.01); *H04Q 2213/13173* (2013.01); *H04Q 2213/13175* (2013.01); *H04Q 2213/13178* (2013.01); *H04Q 2213/13204* (2013.01); *H04Q 2213/13256* (2013.01); *H04Q 2213/13349* (2013.01); *H04Q 2213/13375* (2013.01); *H04Q 2213/13376* (2013.01); *H04Q 2213/13377* (2013.01); *Y10S 379/912* (2013.01)

(58) Field of Classification Search
None
See application file for complete search history.

(56) References Cited

To view the complete listing of prior art documents cited during the proceeding for Reexamination Control Number 90/012,136, please refer to the USPTO's public Patent Application Information Retrieval (PAIR) system under the Display References tab.

*Primary Examiner* — Stephen J Ralis (57) ABSTRACT

Call data signals actuated by a telephone terminal are provided from a telephone communication system to indicate call data as the called number, the calling number and the calling equipment. The call data signals address related control functions for interfacing a multiple-format multiple-port data processing system. Screening tests and format selection for the processing system are performed. Individual telephone terminals and individual data formats are interfaced under controlled conditions specified by the call data. Time tests, history tests and demographic tests are executed in addition to basic qualification tests. Control is executed from active data storage for assembled control words and record words. Record words for individual calls are stored along with developed billing data.

(51) Int. Cl.
*H04M 11/00* (2006.01)
*H04Q 3/00* (2006.01)
*H04Q 3/66* (2006.01)
*H04Q 3/74* (2006.01)
*H04M 3/51* (2006.01)
*H04M 3/50* (2006.01)
*H04M 3/38* (2006.01)
*H04M 3/487* (2006.01)
*H04M 3/493* (2006.01)
*H04Q 3/545* (2006.01)
*H04Q 3/72* (2006.01)
*H04Q 3/64* (2006.01)
*H04M 3/46* (2006.01)
*H04M 3/36* (2006.01)
*A63F 3/08* (2006.01)
*H04M 3/436* (2006.01)
*H04M 3/42* (2006.01)

EX PARTE
REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 10 and 11 are cancelled.

Claims 1-9 and 12-19 were not reexamined.

\* \* \* \* \*